(12) United States Patent
Whitney

(10) Patent No.: US 12,532,946 B2
(45) Date of Patent: Jan. 27, 2026

(54) RATCHET HOUSING ASSEMBLY

(71) Applicant: Kurt Whitney, Monaca, PA (US)

(72) Inventor: Kurt Whitney, Monaca, PA (US)

( * ) Notice: Subject to any disclaimer, the term of this patent is extended or adjusted under 35 U.S.C. 154(b) by 233 days.

(21) Appl. No.: 18/243,513

(22) Filed: Sep. 7, 2023

(65) Prior Publication Data

US 2025/0082072 A1 Mar. 13, 2025

(51) Int. Cl.
*B65D 85/67* (2006.01)
*A44B 11/12* (2006.01)

(52) U.S. Cl.
CPC .................................. *A44B 11/125* (2013.01)

(58) Field of Classification Search
CPC .... A44B 11/125; B65D 85/66; B65D 85/672; B65D 85/04; B65D 85/67; B65H 75/4471; B60P 7/0869; B60P 7/0846; B60P 7/0823
USPC ........ 206/389, 407, 408, 409; 242/405, 395; 410/100; 24/191, 68 CD, 170
See application file for complete search history.

(56) References Cited

U.S. PATENT DOCUMENTS

| | | | |
|---|---|---|---|
| 4,467,979 A * | 8/1984 | Koehler ............. | B65H 75/4471 242/402 |
| 6,109,846 A | 8/2000 | Davis | |
| 6,290,440 B1 * | 9/2001 | DiViccaro ............. | B60P 7/0823 410/101 |
| 7,131,608 B2 * | 11/2006 | Breeden, III ........ | B65H 54/585 242/395 |
| 7,165,294 B2 * | 1/2007 | Surdam ................. | B60P 7/0846 24/68 CD |
| 7,431,548 B2 * | 10/2008 | Acton ................... | B60P 7/0807 410/112 |
| 8,079,116 B2 * | 12/2011 | Ayers .................... | B60P 7/0869 383/902 |
| 8,844,745 B2 * | 9/2014 | Peters ................... | B65D 43/26 220/837 |
| 9,096,159 B2 * | 8/2015 | Wright ................... | B60P 3/079 |
| 9,457,706 B2 | 10/2016 | Wright | |
| 9,908,455 B2 * | 3/2018 | Phelan, Jr. ........... | B60P 7/0853 |
| 10,023,128 B2 * | 7/2018 | Anderson .............. | B60P 7/083 |
| 10,221,037 B1 * | 3/2019 | Blasbalg ............ | B65D 25/2802 |
| 10,793,052 B1 | 10/2020 | Rafuse | |
| 11,130,653 B1 * | 9/2021 | Russo ................. | B65H 54/585 |
| 11,253,112 B1 * | 2/2022 | Bickford .............. | B65D 85/672 |
| 2005/0072708 A1 * | 4/2005 | Selby ................. | B65D 73/0014 206/806 |

(Continued)

FOREIGN PATENT DOCUMENTS

WO WO2010075361 7/2010

*Primary Examiner* — Steven A. Reynolds

(57) ABSTRACT

A ratchet housing assembly for encasing the ratchet strap device from water damage includes a capsule having a cylindrical shape and made of a plastic material. The capsule has a perimeter wall enclosing an interior that defines a space for encasing a ratchet assembly. Furthermore, the perimeter wall has a first edge and a second edge. A side wall is positioned on the first edge of the perimeter wall and a cap is attachable and removable from the second edge of the capsule. The cap is the plastic material and has a hole for inserting a shaft of the ratchet assembly within. A flap assembly is nested within the perimeter wall of the capsule and comprises a pair of flaps. An opening is positioned between each of the flaps and the opening defines an access to the interior of the capsule.

11 Claims, 6 Drawing Sheets

(56) References Cited

U.S. PATENT DOCUMENTS

| | | | |
|---|---|---|---|
| 2015/0136626 A1* | 5/2015 | Hagan | B60P 7/0846 |
| | | | 206/389 |
| 2016/0207681 A1* | 7/2016 | Deshpande | B65D 73/0014 |
| 2016/0376092 A1* | 12/2016 | Breeden, III | B65D 25/2826 |
| | | | 206/341 |
| 2017/0057398 A1 | 3/2017 | Duffin | |
| 2017/0113597 A1* | 4/2017 | Hitsman | B65H 54/585 |

* cited by examiner

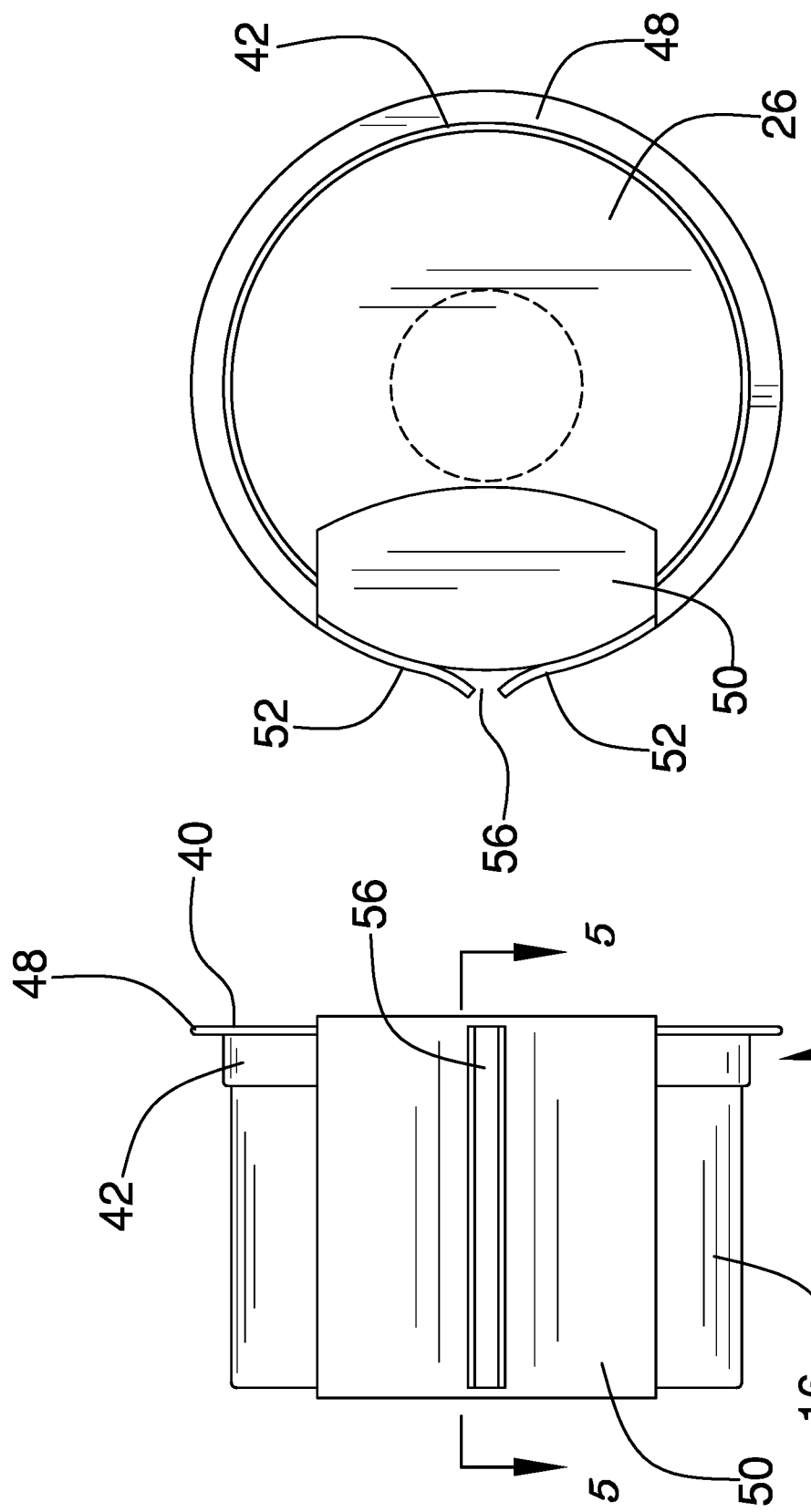

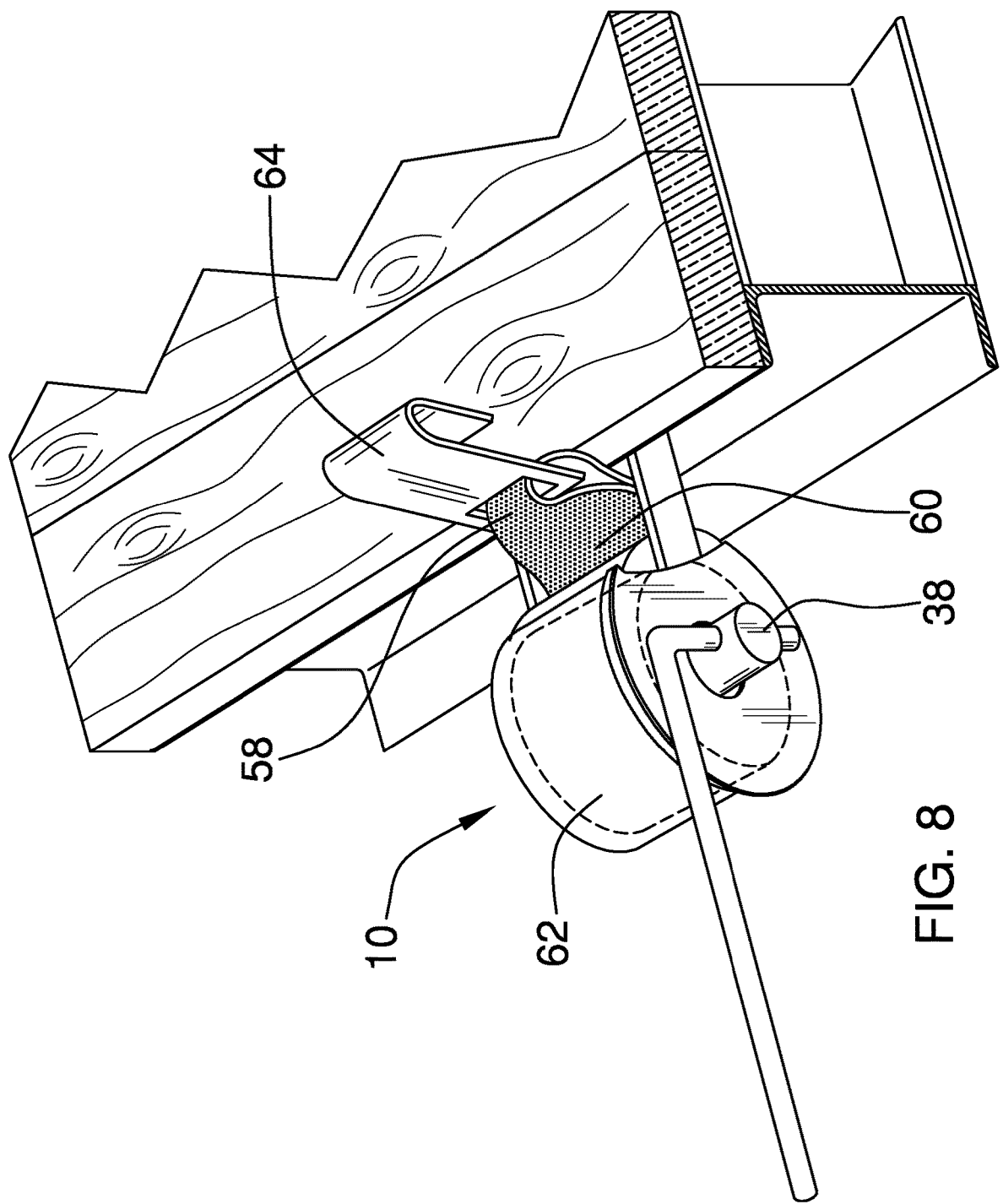

RATCHET HOUSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to ratchet strap device and more particularly pertains to a new ratchet strap device for encasing the ratchet strap device from water damage.

(2) Description of Related Art Including Information Disclosed Under 37 CFR 1.97 and 1.98

The prior art relates to ratchet strap devices. The prior art includes a variety of ratchet strap devices configured for encasing a ratchet assembly. Known prior art lacks a ratchet strap device having a cap configured for facilitating access to the shaft of the ratchet assembly without removing the encasing.

BRIEF SUMMARY OF THE INVENTION

An embodiment of the disclosure meets the needs presented above by generally comprising a capsule. The capsule has a cylindrical shape and is made of a plastic material. The capsule has a perimeter wall enclosing an interior that defines a space for encasing a ratchet assembly. Furthermore, the perimeter wall has a first edge and a second edge. A side wall is positioned on the first edge of the perimeter wall and a cap is attachable and removable from the second edge of the capsule. The cap is the plastic material and has a center where a hole is configured for inserting a shaft of the ratchet assembly within. A flap assembly is nested within the perimeter wall of the capsule and comprises a pair of flaps. Each of the flaps is a rubber material and an opening is positioned between each of the flaps wherein the opening defines an access from the interior of the capsule to an exterior environment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a rear view of an embodiment of the disclosure.

FIG. 4 is a left side view of an embodiment of the disclosure.

FIG. 8 is an in-use view of an embodiment of the disclosure.

DETAILED DESCRIPTION OF THE INVENTION

Figure 1:
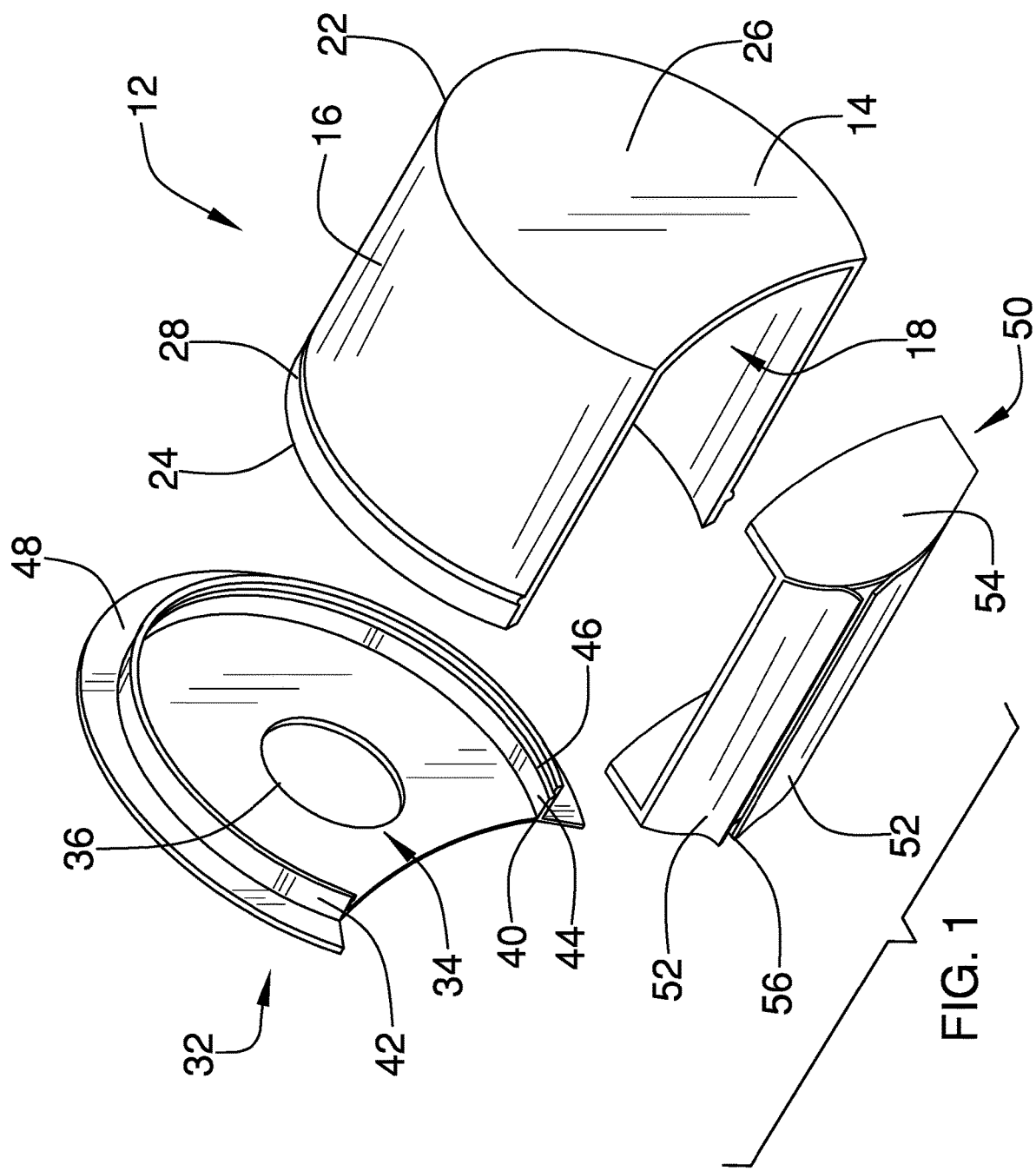
FIG. 1 is a front isometric exploded view of a ratchet housing assembly according to an embodiment of the disclosure.
Figure 2:
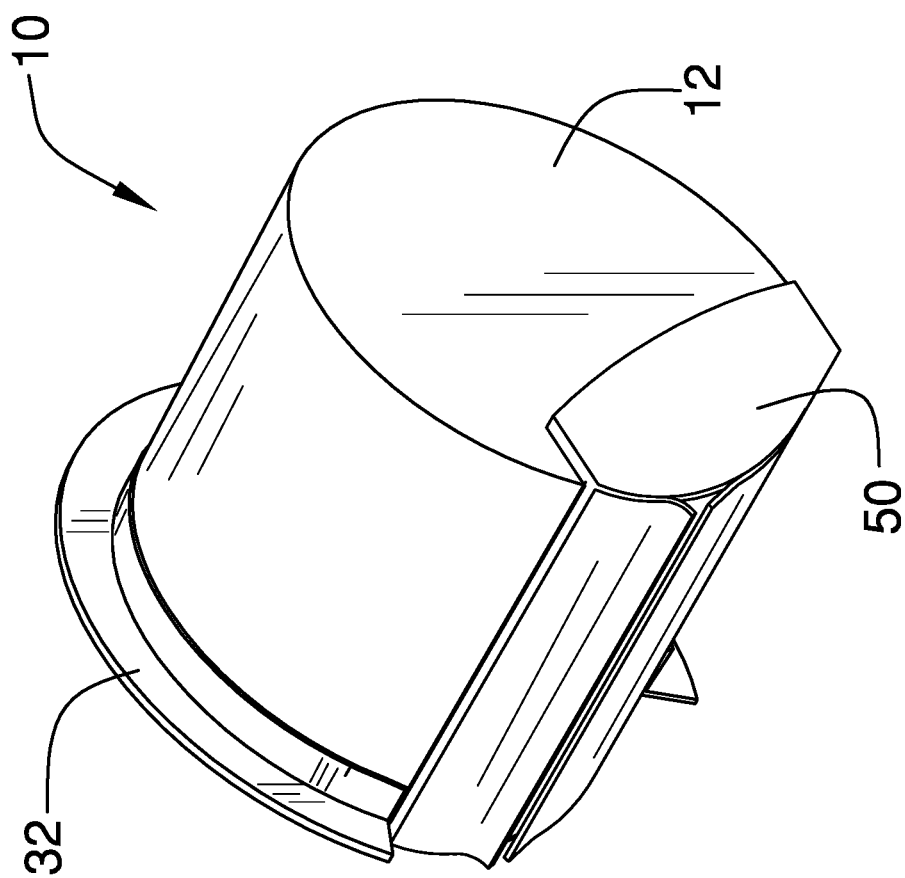
FIG. 2 is a front isometric view of an embodiment of the disclosure.
Figure 6:
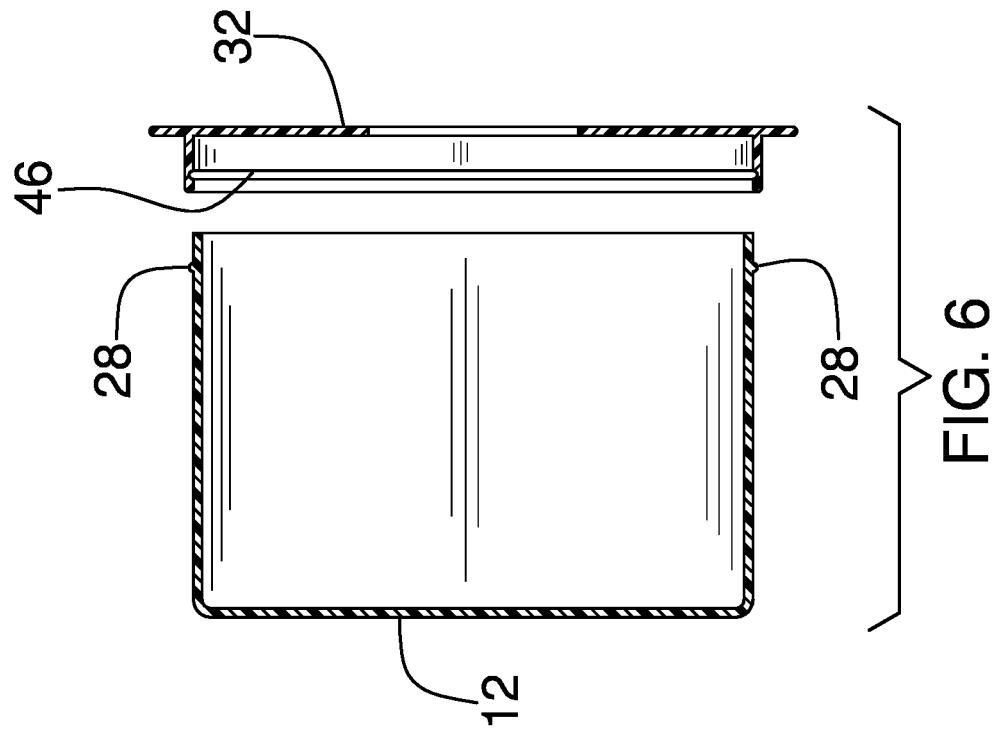
FIG. 6 is an exploded view of an embodiment of the disclosure taken from FIG. 5.
Figure 5:
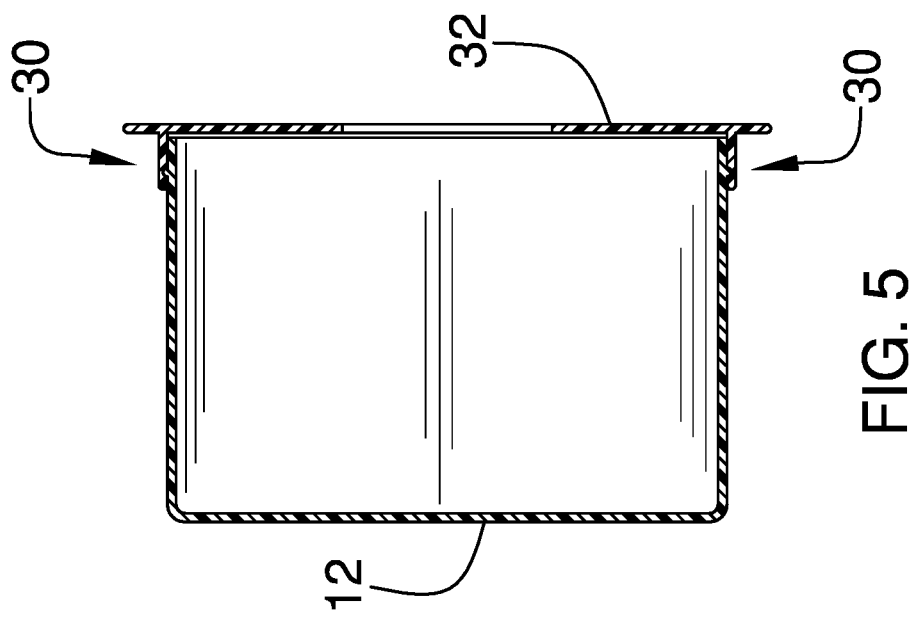
FIG. 5 is a cross-sectional view of an embodiment of the disclosure taken from FIG. 3 of Line 5-5.
Figure 7:
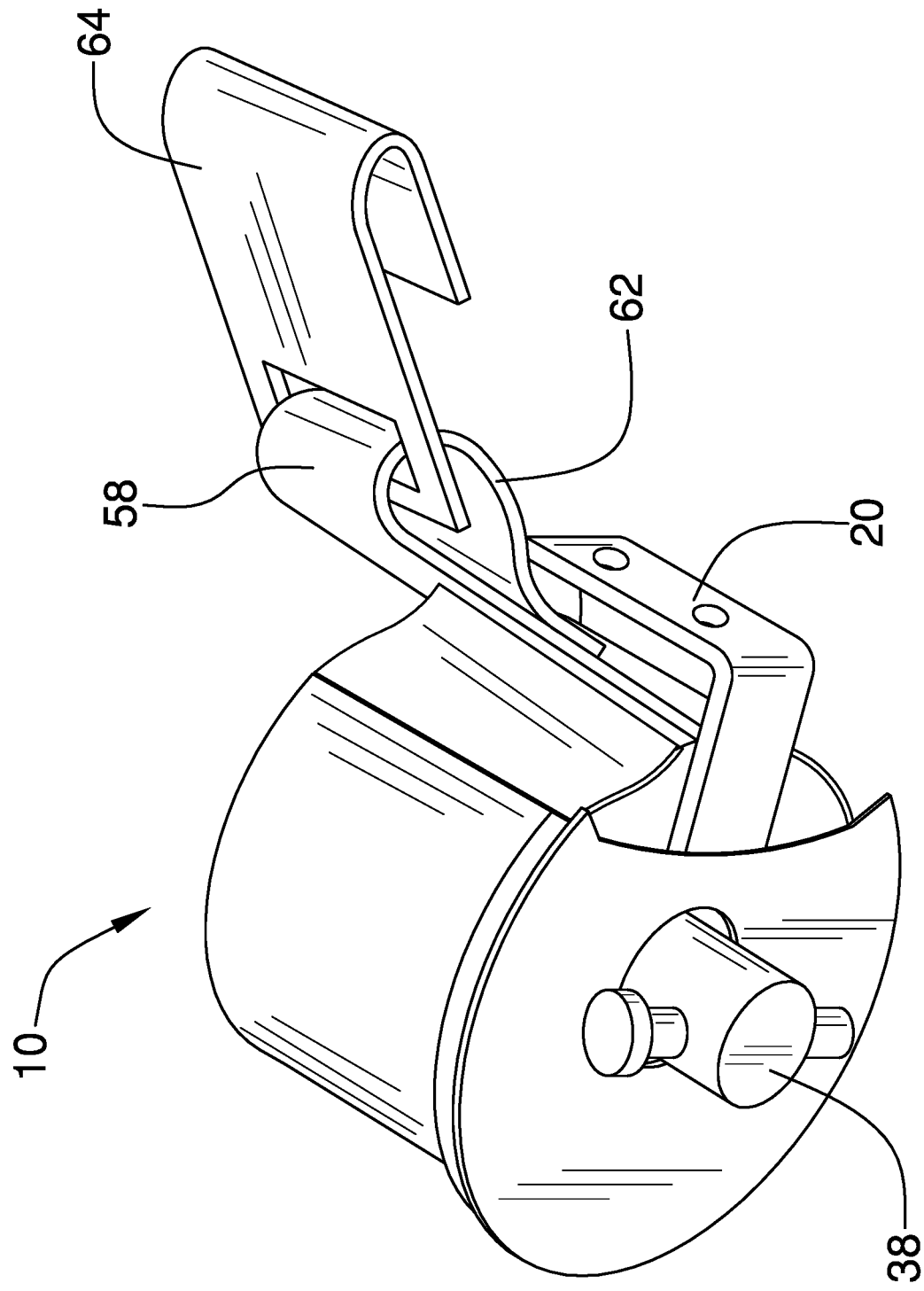
FIG. 7 is an in-use view of an embodiment of the disclosure.

With reference now to the drawings, and in particular to FIGS. 1 through 8 thereof, a new ratchet strap device embodying the principles and concepts of an embodiment of the disclosure and generally designated by the reference numeral 10 will be described.

As best illustrated in FIGS. 1 through 8, the ratchet housing assembly 10 generally comprises a capsule 12. The capsule 12 has a cylindrical shape and is made of a plastic material 14 being configured for having a durable structure and being liquid impervious. The capsule 12 has a perimeter wall 16 being circular and enclosing an interior 18 that defines a space for encasing a ratchet assembly 20. The perimeter wall 16 has a first edge 22 and a second edge 24 with a side wall 26 being positioned on the first edge 22 perpendicular relative to the perimeter wall 16. The second edge 24 has a ring 28 protruding out from the perimeter wall 16 and being a first portion of a snap lock fastening 30.

A cap 32 is attachable and removable from the second edge 24 of the capsule 12. Additionally, the cap 32 is the same as the plastic material 14 of the capsule 12. The cap 32 is a circular plate having center 34 with a hole 36 being configured for inserting a shaft 38 of the ratchet assembly 20 within. The cap 32 has an outer edge 40 where a cover 42 is positioned proximate to. The cover 42 protrudes out from the cap 32 and is positioned perpendicular relative to the cap 32. In addition, the cover 42 has an interior surface 44, and the interior surface 44 has a groove 46 being a second portion of the snap lock fastening 30 wherein the cap 32 is configured for securing to the second edge 24 of the capsule 12 by the snap lock fastening 30. Furthermore, the outer edge 40 of the cap 32 has a flange 48 protruding out from the outer edge 40 and being coplanar with the cap 32. The flange 48 is configured for providing a grip for removing the cap 32 from the capsule 12.

A flap assembly 50 is nested within the perimeter wall 16 of the capsule 12 and comprises a pair of flaps 52. Each of the flaps 52 is a rubber material 54 being configured for being supple and liquid impervious. The pair of flaps 52 is positioned coplanar to each other and an opening 56 is positioned between each of the flaps 52. The opening 56 defines an access from the interior 18 of the capsule 12 to an exterior environment such that an end 58 of a strap 60 of the ratchet assembly 20 can be nested through. The flap assembly 50 is retained in a fixed positioned within the perimeter wall 16 of the capsule 12 by the cap 32.

In use, the ratchet assembly 20 having a roll of straps 62 is nested within the interior 18 of the capsule 12. The shaft 38 of the ratchet assembly 20 is positioned facing the second edge 24 of the perimeter wall 16 of the capsule 12. The end 58 of the strap 60 from the roll of straps 62 is inserted through the opening 56 of the flap assembly 50 prior to attaching a hook assembly 64 to the end 58 of the strap 60. The cap 32 is positioned on the second edge 24 of the perimeter wall 16 wherein the groove 46 of the cover 42 of the cap 32 engages by snap lock fastening 30 to the ring 28 of the second end 24 of the capsule 12. The roll of straps 62 of the ratchet assembly 20 are protected from water damage while the hook assembly 64 and the shaft 38 of the ratchet assembly 20 are still accessible by the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A ratchet housing assembly configured for protecting the straps of a ratchet assembly from water damage, the ratchet housing assembly comprising:
    a capsule has a cylindrical shape, the capsule is a plastic material, the capsule has a perimeter wall, the perimeter wall enclosing an interior, the interior defining a space for encasing a ratchet assembly, the perimeter wall has a first edge and a second edge, a side wall is positioned on the first edge of the perimeter wall;
    a cap is attachable and removable from the second edge of the capsule, the cap is the plastic material, the cap has a center, the center of the cap has a hole, the hole is configured for inserting a shaft of the ratchet assembly within;
    a flap assembly is nested within the perimeter wall of the capsule, the flap assembly comprising a pair of flaps, each of the flaps is a rubber material, an opening is positioned between each of the flaps, the opening defining an access from the interior of the capsule to an exterior environment;
    wherein the second edge has a ring, the ring protruding out from the perimeter wall, the ring is a first portion of a snap lock fastening;
    wherein the cap is a circular plate, wherein the cap has an outer edge; and
    wherein the outer edge of the cap has a flange, the flange protruding out from the outer edge, the flange is coplanar with the cap, the flange is configured for providing a grip for removing the cap from the capsule.

2. The ratchet housing assembly of claim 1, further comprising the plastic material is configured for has a durable structure and is liquid impervious.

3. The ratchet housing assembly of claim 1, further comprising the perimeter wall is circular.

4. The ratchet housing assembly of claim 3, further comprising the side wall is positioned perpendicular relative to the perimeter wall.

5. The ratchet housing assembly of claim 1, further comprising a cover is positioned proximate to the outer edge of the cap, the cover protruding out from the cap, the cover is positioned perpendicular relative to the cap.

6. The ratchet housing assembly of claim 1, further comprising the rubber material is supple and liquid impervious.

7. The ratchet housing assembly of claim 1, further comprising the pair of flaps is positioned coplanar to each other.

8. A ratchet housing assembly configured for protecting the straps of a ratchet assembly from water damage, the ratchet housing assembly comprising:
    a capsule has a cylindrical shape, the capsule is a plastic material, the capsule has a perimeter wall, the perimeter wall enclosing an interior, the interior defining a space for encasing a ratchet assembly, the perimeter wall has a first edge and a second edge, a side wall is positioned on the first edge of the perimeter wall;
    a cap is attachable and removable from the second edge of the capsule, the cap is the plastic material, the cap has a center, the center of the cap has a hole, the hole is configured for inserting a shaft of the ratchet assembly within;
    a flap assembly is nested within the perimeter wall of the capsule, the flap assembly comprising a pair of flaps, each of the flaps is a rubber material, an opening is positioned between each of the flaps, the opening defining an access from the interior of the capsule to an exterior environment;
    the second edge has a ring, the ring protruding out from the perimeter wall, the ring is a first portion of a snap lock fastening;
    wherein the cap is a circular plate, wherein the cap has an outer edge; and
    a cover positioned proximate to the outer edge of the cap, the cover protruding out from the cap, the cover is positioned perpendicular relative to the cap, the cover has an interior surface, the interior surface of the cover has a groove, the groove is a second portion of the snap lock fastening.

9. The ratchet housing assembly of claim 8, further comprising the cap is configured for securing to the second edge of the capsule by the snap lock fastening.

10. The ratchet housing assembly of claim 9, further comprising the flap assembly is retaining in a fixed positioned within the perimeter wall of the capsule by the cap.

11. A ratchet housing assembly configured for protecting the straps of a ratchet assembly from water damage, the ratchet housing assembly comprising:
   a capsule has a cylindrical shape, the capsule is a plastic material, the plastic material is configured for has a durable structure and is liquid impervious, the capsule has a perimeter wall, the perimeter wall is circular, the perimeter wall enclosing an interior, the interior defining a space for encasing a ratchet assembly, the perimeter wall has a first edge and a second edge, a side wall is positioned on the first edge of the perimeter wall, the side wall is positioned perpendicular relative to the perimeter wall, the second edge has a ring, the ring protruding out from the perimeter wall, the ring is a first portion of a snap lock fastening;
   a cap is attachable and removable from the second edge of the capsule, the cap is the plastic material, the cap is a circular plate, the cap has a center, the center of the cap has a hole, the hole is configured for inserting a shaft of the ratchet assembly within, the cap has an outer edge, a cover is positioned proximate to the outer edge of the cap, the cover protruding out from the cap, the cover is positioned perpendicular relative to the cap, the cover has an interior surface, the interior surface of the cover has a groove, the groove is a second portion of the snap lock fastening, the cap is configured for securing to the second edge of the capsule by the snap lock fastening, the outer edge of the cap has a flange, the flange protruding out from the outer edge, the flange is coplanar with the cap, the flange is configured for providing a grip for removing the cap from the capsule; and
   a flap assembly is nested within the perimeter wall of the capsule, the flap assembly comprising a pair of flaps, each of the flaps is a rubber material, the rubber material is configured for is supple and liquid impervious, the pair of flaps is positioned coplanar to each other, an opening is positioned between each of the flaps, the opening defining an access from the interior of the capsule to an exterior environment, the flap assembly is retaining in a fixed positioned within the perimeter wall of the capsule by the cap.

* * * * *